(12) United States Patent
Minola

(10) Patent No.: US 10,989,270 B2
(45) Date of Patent: Apr. 27, 2021

(54) VIBRATION DAMPER FOR PIPES

(71) Applicant: SAIPEM S.P.A., Milan (IT)

(72) Inventor: Paolo Minola, Milan (IT)

(73) Assignee: SAIPEM S.P.A., Milan (IT)

( * ) Notice: Subject to any disclaimer, the term of this patent is extended or adjusted under 35 U.S.C. 154(b) by 180 days.

(21) Appl. No.: 16/076,888

(22) PCT Filed: Jan. 13, 2017

(86) PCT No.: PCT/IB2017/050190
§ 371 (c)(1),
(2) Date: Aug. 9, 2018

(87) PCT Pub. No.: WO2017/137856
PCT Pub. Date: Aug. 17, 2017

(65) Prior Publication Data
US 2019/0048968 A1 Feb. 14, 2019

(30) Foreign Application Priority Data
Feb. 9, 2016 (IT) .................... 102016000013180

(51) Int. Cl.
*F16F 15/08* (2006.01)
*F16L 3/10* (2006.01)
(Continued)

(52) U.S. Cl.
CPC ............ *F16F 15/08* (2013.01); *F16L 3/1066* (2013.01); *F16L 3/1222* (2013.01); *F16L 55/035* (2013.01)

(58) Field of Classification Search
CPC ....... F16L 51/00; F16L 3/1222; F16L 3/1066; F16L 3/1091; F16L 1/0246; F16L 57/06;
(Continued)

(56) References Cited

U.S. PATENT DOCUMENTS 863,887 A * 8/1907 Stuttle .................... F16L 21/06
285/373
896,333 A * 8/1908 Smith .................... F16L 41/06
285/113
(Continued)

FOREIGN PATENT DOCUMENTS

CN 108895206 A * 11/2018
CN 109027427 A * 12/2018
(Continued)

OTHER PUBLICATIONS

International Search Report and Written Opinion of the International Searching Authority for International Patent Application No. PCT/IB2017/050190 dated Mar. 28, 2017, 12 pages.

*Primary Examiner* — Kimberly T Wood
(74) *Attorney, Agent, or Firm* — Merchant & Gould P.C.

(57) ABSTRACT

A damping device (1) for pipelines (2) includes a compression ring (3) with three ring segments (4) that can be positioned around a pipe (2). Each ring segment (4) forms a damper seat (8) that receives at least one damping element (9) made of elastomeric material intended to be radially compressed against an outer surface of the pipe (2). The damper seat (8) is in shape connection with the damping element (9) so as to prevent the damping element (9) from being released from the damper seat (8) in an axial direction and in a radial direction.

18 Claims, 11 Drawing Sheets

(51) Int. Cl.
*F16L 3/12* (2006.01)
*F16L 55/035* (2006.01)

(58) Field of Classification Search
CPC ... F16L 3/24; F16L 3/10; F16L 55/035; F16L 3/00; F16B 1/00; F16F 15/08
USPC ......... 248/65, 74, 74.4, 74.5, 74.1; 188/268, 188/33, 36; 285/373, 411
See application file for complete search history.

(56) References Cited

U.S. PATENT DOCUMENTS

| | | | | |
|---|---|---|---|---|
| 982,028 | A * | 1/1911 | Austin | F16L 41/12 285/197 |
| 2,355,742 | A * | 8/1944 | Morehouse | F16L 3/2235 248/68.1 |
| 2,417,741 | A * | 3/1947 | Dillon | F16L 17/04 285/373 |
| 2,795,770 | A * | 6/1957 | Toedtman | H01R 4/62 439/886 |
| 3,204,900 | A * | 9/1965 | Gilbert | F16L 3/00 248/56 |
| 3,251,615 | A * | 5/1966 | Short, III | F16L 17/04 285/112 |
| 3,252,192 | A * | 5/1966 | Smith | F16L 1/10 269/117 |
| 3,564,676 | A * | 2/1971 | Oeser | F16L 3/1016 24/279 |
| 3,606,218 | A * | 9/1971 | Enlund et al. | F16L 3/1091 248/74.2 |
| 3,954,288 | A * | 5/1976 | Smith | F16L 1/26 285/93 |
| 4,391,458 | A * | 7/1983 | Blakeley | F16L 41/12 285/112 |
| 4,768,813 | A * | 9/1988 | Timmons | F16L 21/06 138/99 |
| 5,435,506 | A * | 7/1995 | Wiley | F16L 3/10 248/74.1 |
| 5,480,193 | A * | 1/1996 | Echols | F16L 21/06 285/318 |
| 5,769,556 | A * | 6/1998 | Colley | B62H 3/02 24/335 |
| 6,131,957 | A * | 10/2000 | Saito | F16L 21/04 285/133.21 |
| 6,241,199 | B1 * | 6/2001 | Ismert | F16L 59/024 248/56 |
| 6,305,719 | B1 * | 10/2001 | Smith, Jr. | F16L 55/175 285/15 |
| 6,367,849 | B1 * | 4/2002 | Tatsuta | F16L 21/06 285/373 |
| 8,910,912 | B2 * | 12/2014 | Child | F16L 3/2235 248/73 |
| 9,038,968 | B2 * | 5/2015 | Hennon | F16L 3/1091 248/65 |
| 2007/0068588 | A1 * | 3/2007 | Britton | F16L 3/1091 138/106 |
| 2007/0295867 | A1 | 12/2007 | Hennon | |
| 2014/0346291 | A1 * | 11/2014 | Booth | H02G 7/053 248/74.4 |
| 2018/0372250 | A1 * | 12/2018 | Putorti | F16L 3/223 |
| 2020/0018436 | A1 * | 1/2020 | Kristiansen | F16L 59/20 |

FOREIGN PATENT DOCUMENTS

| | | | | |
|---|---|---|---|---|
| DE | 4229345 A1 * | 3/1994 | | E21B 19/07 |
| DE | 10 2007 020 498 B3 | 10/2008 | | |
| EP | 0 159 958 A1 | 10/1985 | | |
| EP | 1 873 435 A1 | 1/2008 | | |
| IT | MI2009A001150 A | 1/2011 | | |
| JP | 10047566 A * | 2/1998 | | F16L 3/00 |
| RU | 2078275 C1 * | 4/1997 | | F16L 1/00 |

* cited by examiner

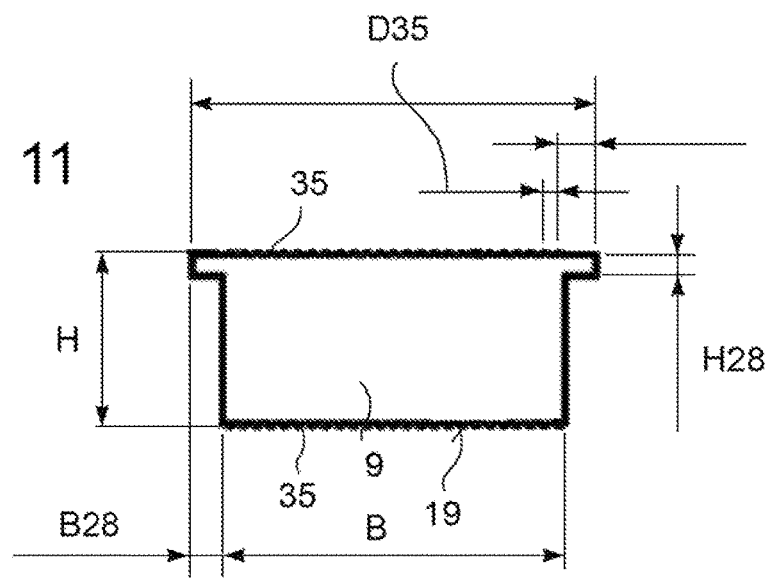
FIG. 11
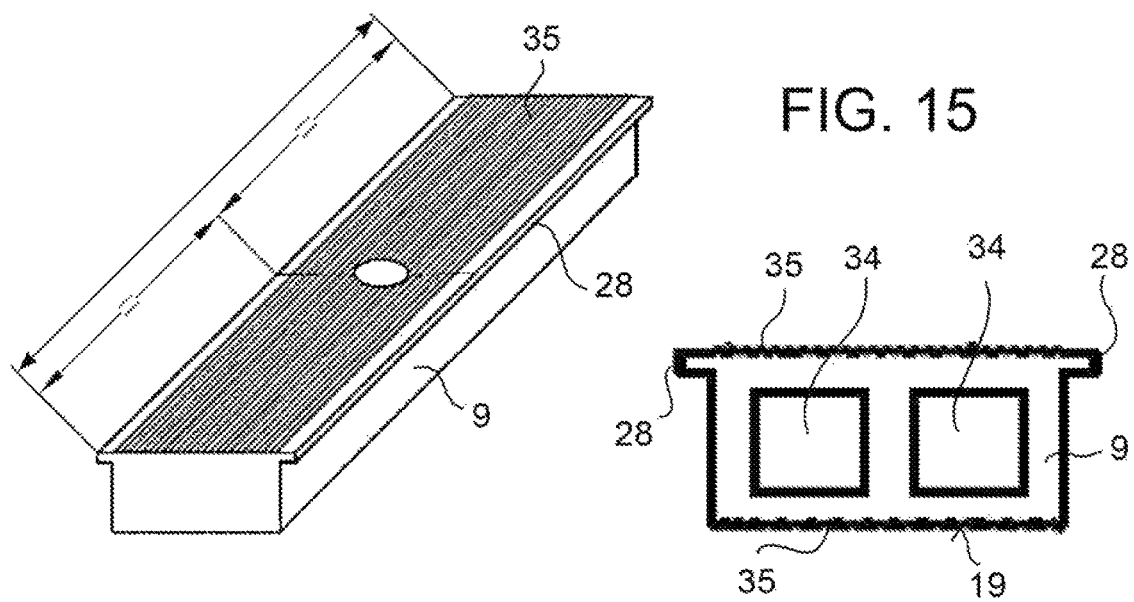
FIG. 15
FIG. 14
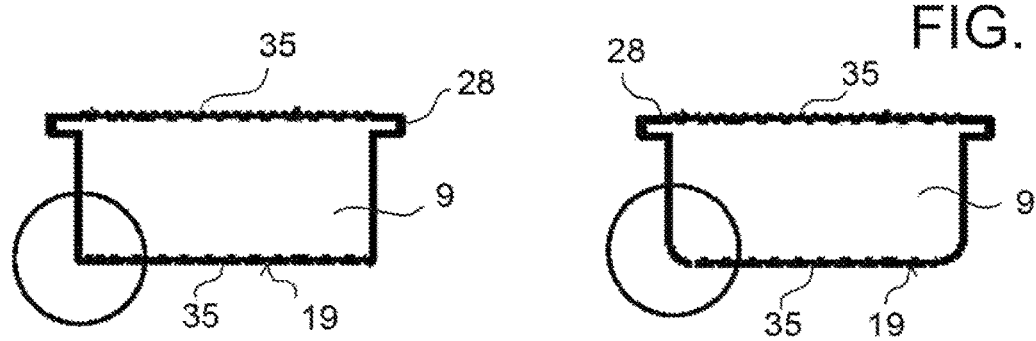
FIG. 12  FIG. 13

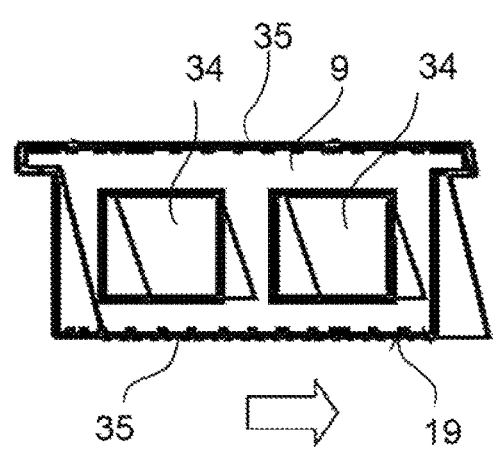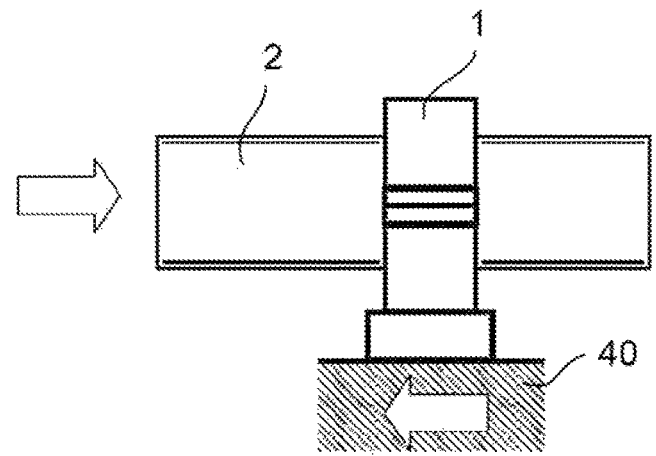
FIG. 16  FIG. 17
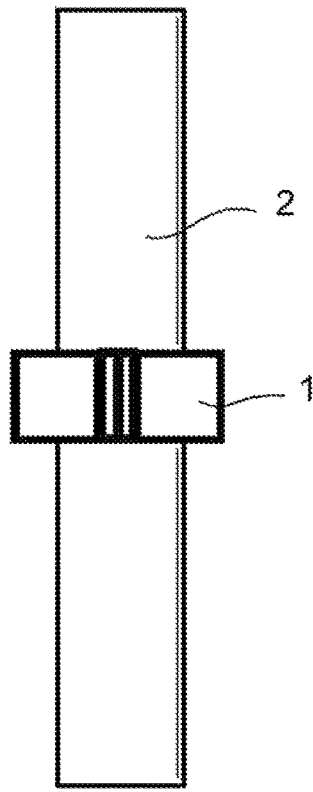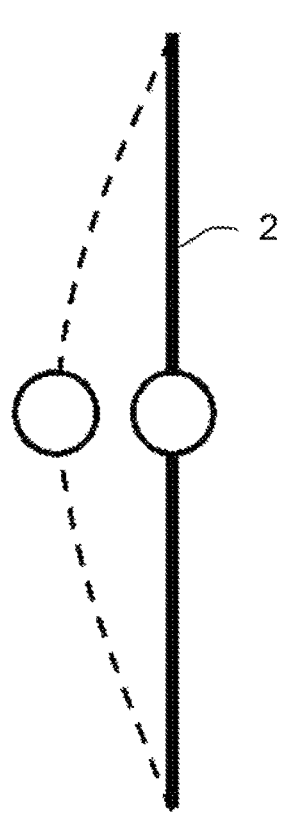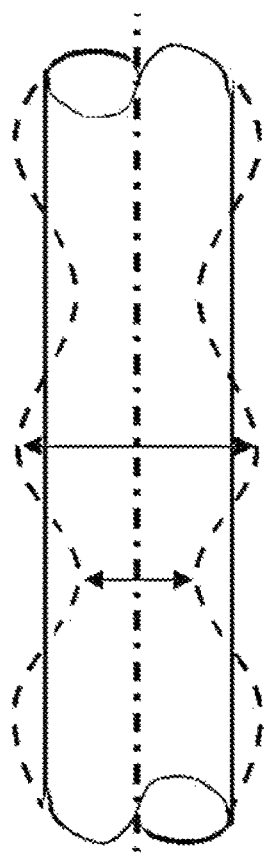
FIG. 18  FIG. 19  FIG. 20

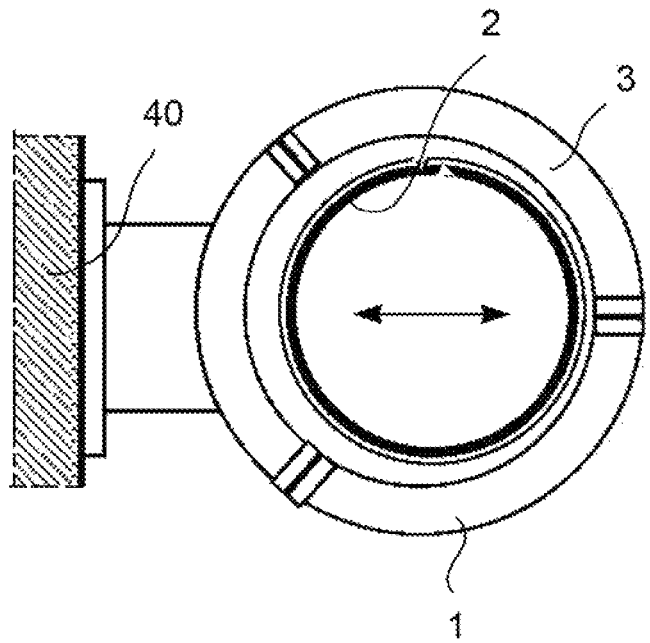
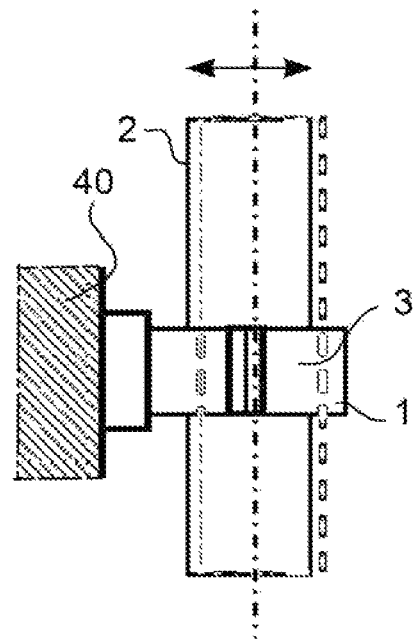
FIG. 21     FIG. 22
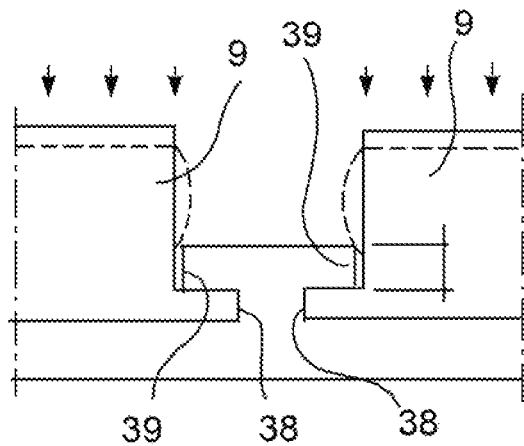
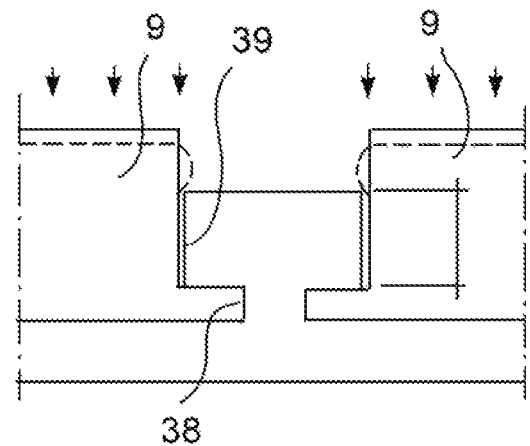
FIG. 23     FIG. 24

VIBRATION DAMPER FOR PIPES

This application is a National Stage Application of PCT/IB2017/050190, filed 13 Jan. 2017, which claims benefit of Ser. No. 10/201,6000013180, filed 9 Feb. 2016 in Italy, and which applications are incorporated herein by reference. To the extent appropriate, a claim of priority is made to each of the above-disclosed applications.

BACKGROUND OF THE INVENTION

The present invention relates to a damping device for on-shore and off-shore industrial system pipelines subject to mechanical and acoustic vibrations.

Industrial pipelines for conveying fluids in liquid, gaseous or mixed phase, or granules or powders either suspended or transported by means of a carrier gas or liquid are subjected, either cyclically or occasionally, to mechanical and/or acoustic vibrations caused by the passage of the flow inside them or by the vibrations induced from the outside, such as, for example, by rotating or reciprocating machines connected to the pipeline, e.g. by means of nozzles. The vibrations generated in the pipelines cause the propagation of flexural waves (with local deformations of the pipe section) and/or of bending oscillations (with cyclical displacements of the entire pipe section), which, if not dissipated, may cause fatigue failures of the pipe, particularly in the structural zones with high strain concentration, e.g. in connection, branching and welding zones.

Underground industrial pipelines display a substantially continuous constraint, given by the ground, which is usually suitable for dissipating the kinetic energy at least of the bending oscillations. Overground industrial pipelines having pipe stretches freely extending between discreet resting points do not have damping features suited to dissipate the kinetic energy of the bending vibrations, and in particular of the flexural vibrations. In such pipelines, the resting or fixing constraints in the discreet points, rather than damping vibrations and dissipating kinetic energy, influence only the natural frequencies of the entire pipeline system in a non-targeted manner which is difficult to plan with reference to an effective vibration damping.

It is also known to make fixing points of the pipelines by means of a clamp having a connection plate for fixing the clamp by means of bolts to a supporting structure (ground structure, building, supporting frame etc.), as well as a metal sheet band welded to the connection plate and tightened about the pipe, by means of the interposition of a thin elastomeric strip wound externally about the pipe in the fixing point. The purpose of the thin strip of elastomeric material is to compensate the non-complementarity of shape between the metallic band and the outer circumference of the pipe, and to prevent damage to possible outer coatings of the pipe. However, the elastomeric strip is too thin to be able to damp pipe vibrations, which propagate along the pipe and are transmitted in non-damped manner from the pipe to the supporting structure.

In order to protect the supporting structure it is known to interpose an elastomeric layer between the connection plate of the clamp and the supporting structure. However, in the prior art, the pipelines and also the fixing clamps, in particular their weldings, are still subject to undesired fatigue failure and cracking phenomena caused by the flexural and bending vibrations of the pipes.

SUMMARY OF THE INVENTION

It is thus the object of the present invention to provide a damping device for pipes subject to mechanical and acoustic vibrations having features so as to avoid at least some of the drawbacks of the prior art.

It is a particular object of the invention to provide a damping device for pipelines having features so as to damp vibrations, in particular bending vibrations, which cause local deformations and local distortions of the pipe section.

It is further a particular object of the invention to provide a damping device for pipelines having features so as to damp vibrations, in particular bending vibrations, which cause cyclic or random displacements of the pipe section.

It is a further particular object of the invention to provide a damping device for pipes, usable in combination with a fixing system either to the ground or to a supporting structure and/or in a zone of the pipeline which is free from external constraint.

These and other objects are achieved by means of a damping device for pipelines, comprising:
- a compression ring having a plurality of ring segments which can be positioned about a pipe (of circular section), connected and brought together by means of connection and tightening means, so as to form an annular structure with adjustable circumference with respect to an axis of the pipe, wherein each ring segment forms, in a radially inner surface thereof, a damper seat which receives at least one damping element made of elastomeric material, projecting radially from the ring segment and intended to be radially compressed against an outer surface of the pipe, wherein said damper seat comprises:
- an axial constraint portion in shape connection with the damping element so as to prevent the damping element from escaping from the damper seat in the axial direction,
- a radial constraint portion in shape connection with the damping element so as to prevent the damping element from escaping from the damper seat in the radial direction. By virtue of the damping elements radially protruding from the ring segments and their axial and radial constraint by means of shape connection, it is possible to precompress the damping elements against the outer surface of the pipe in a purposeful and predictable manner and, in this way, to dissipate the energy of the bending vibrations (cyclic displacements of the entire section in direction transversal to the pipe axis), of the flexural vibrations (local distortions or deformations of the pipe section) and of axial vibrations or displacements, by means of cyclic deformation with hysteresis of the damping elements.

BRIEF DESCRIPTION OF THE DRAWINGS

In order to better understand the invention and appreciate its advantages, some non-limitative examples of embodiments will be described below with reference to the figures, in which:

FIGS. 11-14 are sectional views of damping elements of the damping device according to embodiments;

FIG. 15 is a perspective view of a damping element before it is mounted in a ring segment of the damping device;

FIG. 16 is a diagrammatic sectional view of a damping element deformed in axial direction;

FIG. 17 shows a relative axial displacement situation between a pipe and an outer constraint (fixing to the ground) to which the deformation of the damping element in FIG. 16 corresponds;

FIG. 18 shows the damping device applied to a stretch of pipe which is free from external constraints;

FIG. 19 shows the auxiliary inertial mass effect of the damping device applied to a free stretch of the pipeline;

FIG. 20 is a diagrammatic view of the propagation of flexural waves along a stretch of pipe;

FIGS. 21 and 22 show transversal displacements or flexural vibrations of a pipe provided with the damping device according to an embodiment;

Figure 25:
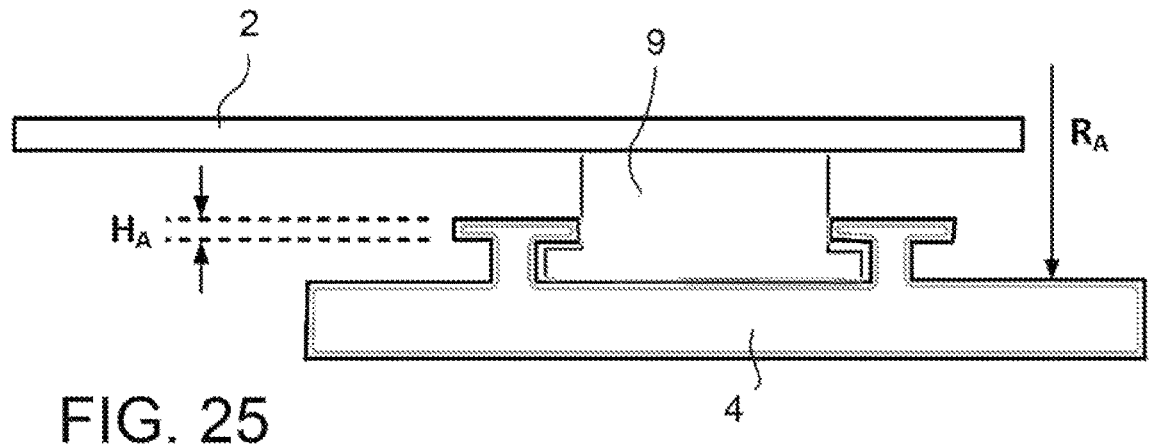
Figure 26:
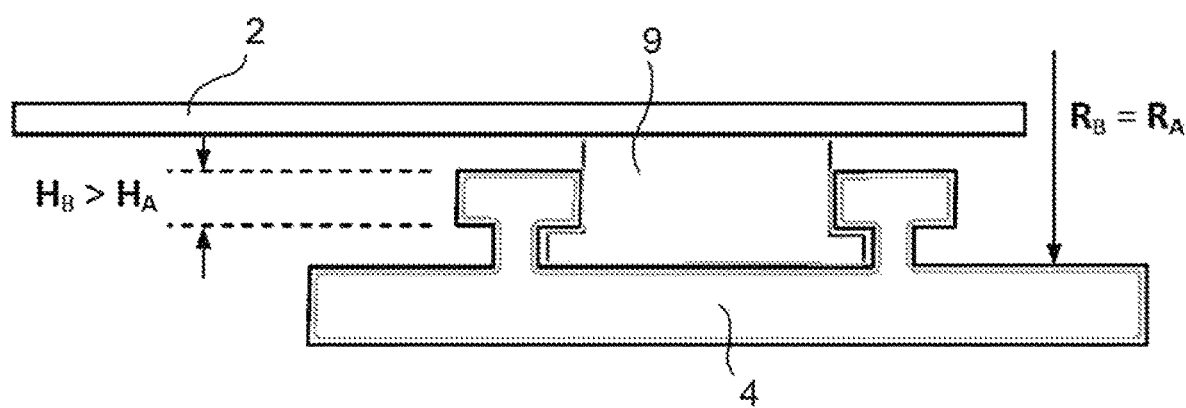
Figure 27:
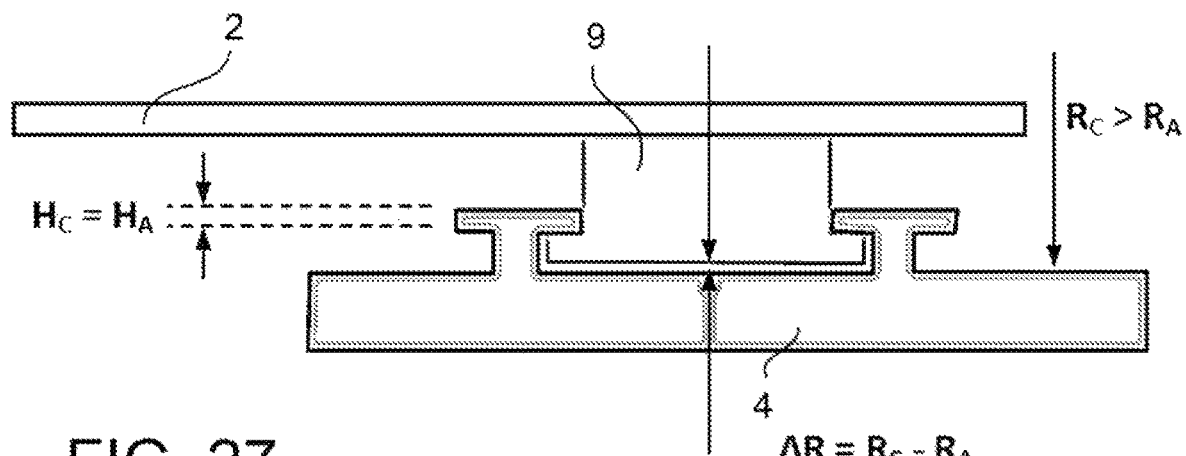
Figure 28:
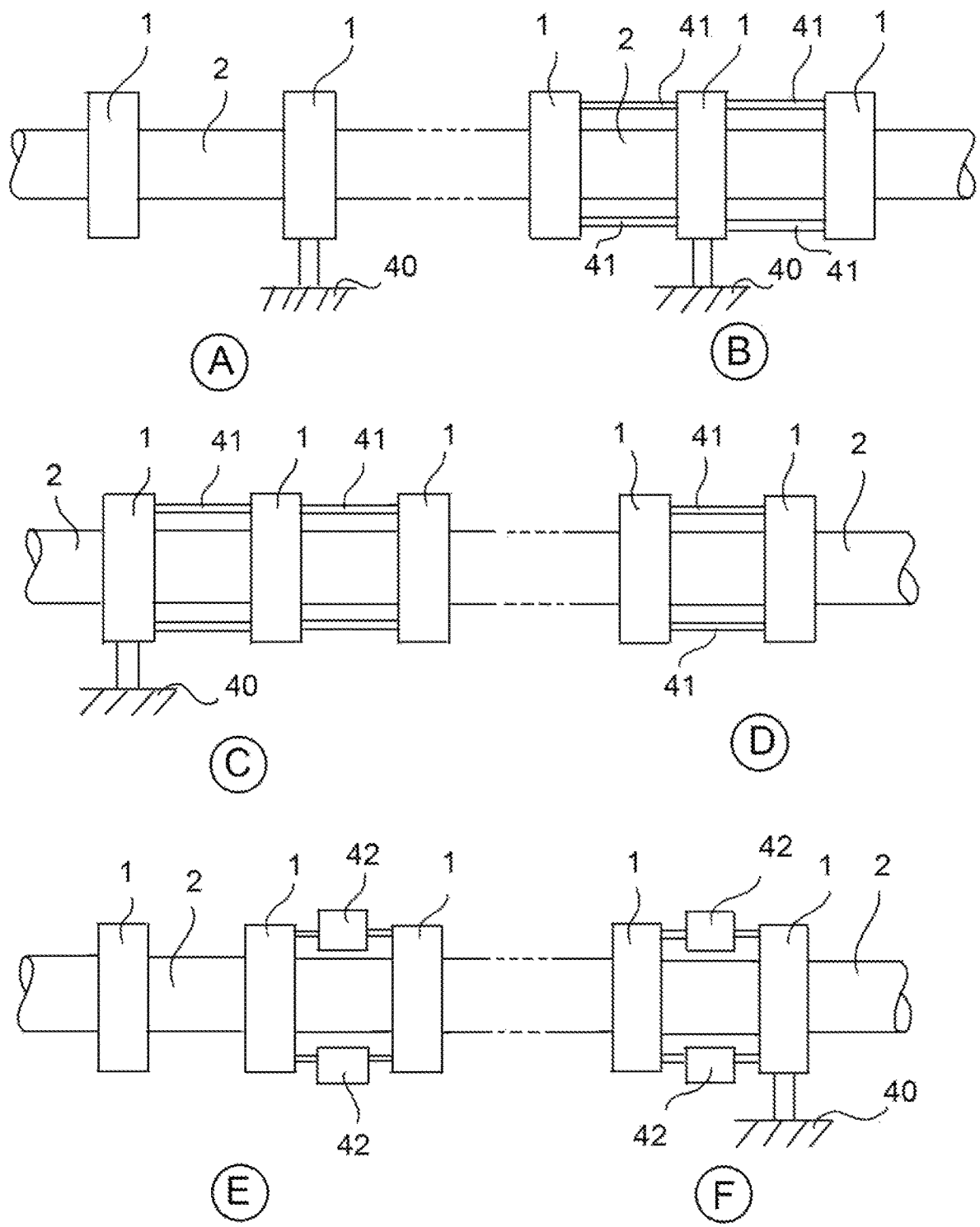

the FIGS. 23 and 24 are radial section views of the damping device according to two embodiments, with respective deformations of the damping element following radial precompression;

FIGS. 25, 26 and 27 show three different radial precompression strategies of the damping elements against the pipe, by means of different circumferential and radial tightening of the compression ring and by means of different impediments of the transversal expansions of the damper element;

FIGS. 28 A-F diagrammatically show different examples of combination and application of the damping device according to embodiments.

DETAIL DESCRIPTION OF THE PREFERRED EMBODIMENTS

With reference to the figures, a damping device 1 for pipelines 2 comprises a compression ring 3 having a plurality of ring segments 4 which can be positioned about a pipe 2 (of circular section) and which can be connected and brought together circumferentially by means of connection and tightening means 5, so as to form an annular structure with adjustable circumference with respect to an axis 6 of the pipe 2. Each ring segment 4 forms, in a radially inner surface 7 thereof, a damper seat 8 which receives at least one damping element 9 made of elastomeric material, projecting radially from the ring segment 4 and intended to be radially compressed against an outer surface of the pipe 2. According to an aspect of the invention, the damper seat 8 comprises:

one or more axial constraint portions 10 in shape connection with the damping element 9 so as to prevent the damping element 9 from escaping from the damper seat 8 in the axial direction, one or more radial constraint portions 11 in shape connection with the damping element 9 so as to prevent the damping element 9 from escaping from the damper seat 8 in the radial direction.

By virtue of the damping elements 9 radially projecting from the ring segments 4 and their axial and radial constraint by means of shape connection, it is possible to precompress the damping elements 9 against the outer surface of the pipe 2 in a purposeful and predictable manner and, in this way, to dissipate the energy of the bending oscillations (cyclic movements of the entire section in direction transversal to the pipe axis) and of the flexural vibrations (local distortions or deformations of the pipe section with propagation in longitudinal direction of the pipe) and of axial vibrations or displacements, by means of cyclic deformation with hysteresis of the damping elements 9.

According to an embodiment, the compression ring 3 comprises at least two, preferably three, rigid ring segments 4. Furthermore, the circumferential extension of the single ring segments is substantially the same. The choice of three rigid ring segments 4 with substantially equal circumferential extension and connected to one another in series in three connection and tightening zones (tangential) arranged at an angular pitch of substantially 120°, reconciles the need of applying the circumstantial tightening uniformly distributed on the circumference and the need of rigidity and of local shape accuracy of the ring segments 4 along extended stretches of the circumference of the compression ring 3.

Indeed, too many single ring segments would cause an annular "chain", which would adapt to the section distortions of the pipe 2 in case of flexural vibrations, without differential deformation and hysteresis of the damping elements 9. On the other hand, too few rigid ring segments 4 would imply the non-uniform application of the tangential tightening of the compression ring 3, and consequently a non-uniform radial compression of the damping elements 9.

In an embodiment, the ring segments 4 each form a reinforcing wall 21 oriented in a transversal plane, preferably perpendicular to the axis 6 of the pipe 2 and extending in circumferential direction along substantially the entire length of the ring segment 4. The reinforcement wall 21 stiffens the ring segment 4 against bending about the axis 6 of the pipe 2. In all cases, in order to allow an adaptation of the shape of the ring segments 4 to the pipe circumference 2 (taking into account the interposition of the precompressed damping elements 9), without however compromising the shape stability and relative stiffness of the ring segments 4 with respect to the softer elastomeric material of the damping elements 9, the reinforcing walls 21 may form a radial notch 22 placed at approximately half their circumferential extension and extending from the radial outer edge with a radial depth from about ¼ to about ½ of the radial height of the reinforcing wall 21.

According to an embodiment, the connection and constricting means 5 comprise bolts 12 received in connection holes 13 of connection plates 14 at the two opposite circumferential ends of each ring segment 4, so as to be able to adjust and mutually approach the adjacent circumferential ends of respectively two ring segments 4 and to adjust a circumferential distance between said two adjacent circumferential ends which corresponds to an adjustment stroke of the precompression of the damping elements 9. According to an embodiment, the connection and tightening means 5 may be bolt means of the AXIBLOCK® type described in patent application IT-MI2009A001150, the content of which is considered incorporated in the present description.

Advantageously, the connection and constricting means 5 or bolts 12 comprise means which can be pretensioned and which are configured to maintain a preset tension force also in presence of small variations of distance between the ring segments 4, for example due to viscous deformations of the damping elements 9 under constant load.

According to a further embodiment of the invention, the damper seat 8 of each ring segment 4 is configured to receive and constrain, in axial direction and in radial direction, a plurality of at least two, preferably three, damping elements 9 mutually spaced apart so as to allow for each of the damping elements 9 of the same ring segment 4 its own radial deformation and transversal deformation with respect to the radial direction irrespective of the deformation state of the other damping elements 9.

This makes it possible to equip the damping device 1 with a varying chosen number of damping elements 9 and a targeted chosen positioning of the damping elements 9 in circumferential direction/sequence and/or in axial direction/sequence.

According to a further embodiment, the damper seat 8 of each ring segment 4 is configured to receive the one or more damping elements 9 in removable and replaceable manner.

Advantageously, all the damping elements 9 of the damping device 1 have the same shape and size so as to be positionable, as desired, in any of the damper positions defined by the damper seats 8.

With further advantage, the damping device 1 comprises a plurality of damping elements 9, which may be mutually different (except for the outer shape, which may be advantageously identical) either already mounted or ready to be mounted in the damper seats 8, and having different material features (e.g. elastomeric compound, specific dissipated energy for hysteresis cycle, density, hardness, ultimate tensile strength, maximum elongation at break, temperature range of use) or different internal structure (e.g. a solid block or a block with internal cavities or a block with meshes or reinforcement plates embedded in the elastomeric compound), such to be combinable with reference to the material and to the internal structure, and with reference to the positioning in the damping device 1 to allow a targeted and selective setting and/or adjustment of the damping properties of the damping device 1. Advantageously, damping elements 9 with different properties have a marking, preferably a color of the elastomeric compound, which can be distinguished and is different to facilitate the identification and the control of the assembly of the damping element 9 with the desired properties.

According to an embodiment, in addition to the axial and radial constraints obtained by means of shape coupling, the damper seat 8 either forms or comprises one or more circumferential constraint portions 27 in shape connection with the damping element 9 so as to prevent a displacement or escape of the damping element 9 from the damper seat 8 in the circumferential direction with respect to the axis 6 of the pipe 2.

This ensures that, during the assembly and mounting of the compression ring 3 about the pipe 2, the damping elements 9 remain in their initial position with correct geometric and structural continuity between the ring segments 4, the damping elements 9 and the pipe 2. According to an aspect of the invention, each single damping element 9 has a compact geometric shape with a radial height H greater than one third of the axial width B, preferably the radial height H is comprised in the range from 0.4 B to 0.7 B, even more preferably from 0.45 B to 0.55 B. In a preferred embodiment, the radial height H is roughly half the axial width B. The value of the radial height H refers to the damping element not already precompressed and denotes the radial distance between the radially inner and outer surfaces of the damping element 9 which transmit the radial compression pressure. The axial width value B refers to the width measured in a radially inner portion of the damping element 9 in contact with the pipe 2.

The circumferential length L of the damping element 9 is substantially equal to the circumferential length of the ring segment 4 to which it is mounted.

In order to ensure an adequate dissipative capacity, it is advantageous to select the radial height H greater than 15 mm, preferably in the range from 15 mm to 35 mm, more preferably from 20 mm to 30 mm. In a preferred embodiment, the radial height H is in the range from 25 mm to 26 mm, preferably 25.5 mm.

The compact shape of the damping elements 9 ensures a uniform deformation without instability or local crushing phenomena of the section, such to absorb and dissipate a high amount of kinetic energy and effectively damp the vibration of the pipe 2.

According to a further aspect of the invention, in operating condition, in the compression ring 3 mounted and tightened about the pipe 2, the adjacent circumferential ends of the ring segments 4 (and preferably the corresponding adjacent circumferential ends of the damping elements 9) are mutually spaced apart by a distance 16 or residual precompression stroke, such as to prevent the tangent or circumferential tightening force from being contrasted by a direct abutment between the rigid ring segments 4, and such as to ensure that the tangent or circumferential tightening force brings about a corresponding radial narrowing of the compression ring 3 with consequent radial compression and deformation of the damping elements 9 against the outer surface of the pipe 2.

Furthermore, the distance 16 between the adjacent circumferential ends of the ring segments 4 allows the insertion of a radial seal 17 between them to prevent the risk of interstitial corrosion and of depositing of material present in the atmosphere.

According to an embodiment, the distance 16 before the tightening of the compression ring 3 is in the range from 10 mm to 20 mm, preferably from 13 mm to 17 mm, preferably about 15 mm, while the residual distance 16 after tightening of the compression ring 3 is in the range from 1 mm to 3 mm, preferably from 1 mm to 2 mm, preferably about 1.6 mm. Similarly, the radial predeformation ΔH (H after tightening the compression ring 3—initial H) of the damping elements 9 is in the range from 2 mm to 10 mm, preferably from 3 mm to 6 mm, preferably about 5 mm.

Similarly to the distance 16 between the adjacent circumferential ends of the ring segments 4, the damping device 1 ensures and comprises a radial distance 18 between the radially inner surface 7 of the ring segments 4 and the radially inner surface 19 of the damping element or elements 9 in the same radial plane in each planned operative condition. This radial distance 18 constitutes a residual radial compression/deformation stroke of the damping elements 9 intended to compensate the vibrations of the pipe 2 and to absorb the kinetic energy.

Furthermore, the radial distance 18 allows the insertion of two circumferential seals 17, one on each side, between the outer surface of the pipe and the radially inner surfaces 7 of the compression ring 3, to prevent the introduction of foreign substances and humidity in the space containing the damping elements 9.

For this purpose, the damping elements 9 are arranged completely inside the axial dimension of the ring segments 4 which project on both sides axially beyond the damping elements 9.

According to an embodiment, the radial distance 18 before the tightening of the compression ring 3 is in the range from 12 mm to 22 mm, preferably from 15 mm a 19 mm, preferably about 17 mm, while the residual radial distance 18 after tightening of the compression ring 3 is in the range from 7 mm to 17 mm, preferably from 10 mm to 14 mm, preferably about 12 mm.

According to an embodiment (FIG. 1), each ring segment 4 comprises a base wall 15, preferably made of metal, e.g. steel, having an arc-of-circle shape and that forms the radially inner surface 7 with the damper seat 8 on the concave inner side thereof, as well as the connection plates 14, also preferably made of metal, e.g. steel, oriented in radial planes with respect to the axis 6 of the pipe 2 (which coincides with a reference axis of the damping device 1) and welded to the base wall 15 (on a convex outer wall thereof) at the two circumferential ends of the ring segment 4. On the outer convex side of the base wall 15 are further arranged the two reinforcing walls 21 parallel and orthogonal to the axis 6, which walls 21 extend in the circumferential direction, respectively close to two opposite circumferential edges of the ring segment 4. The reinforcing walls 21 are also preferably made of metal, e.g. steel, and welded both to the base wall 15 and to each of the connection plates 14.

The entire ring segment 4 is preferably made of steel.

The damper seat 8 forms a plurality of at least two, preferably three, channels 26 arranged next to one another side-by-side and extending along the entire circumferential extension of the ring segment 4. The channels 26 all have the same shape and are delimited by a base surface 23 and two side surfaces 24, 25, each forming a groove 38, which forms a widening or side undercut adjacent to the base surface 23, and a rib 39, which forms a side shoulder or narrowing on a side of the groove 38 opposite the base surface 23. This "T"-shaped radial section is preferably constant along the entire circumferential extension of the channels 26 and forms the aforesaid axial 10 and radial 11 constraint portions.

Figure 2:
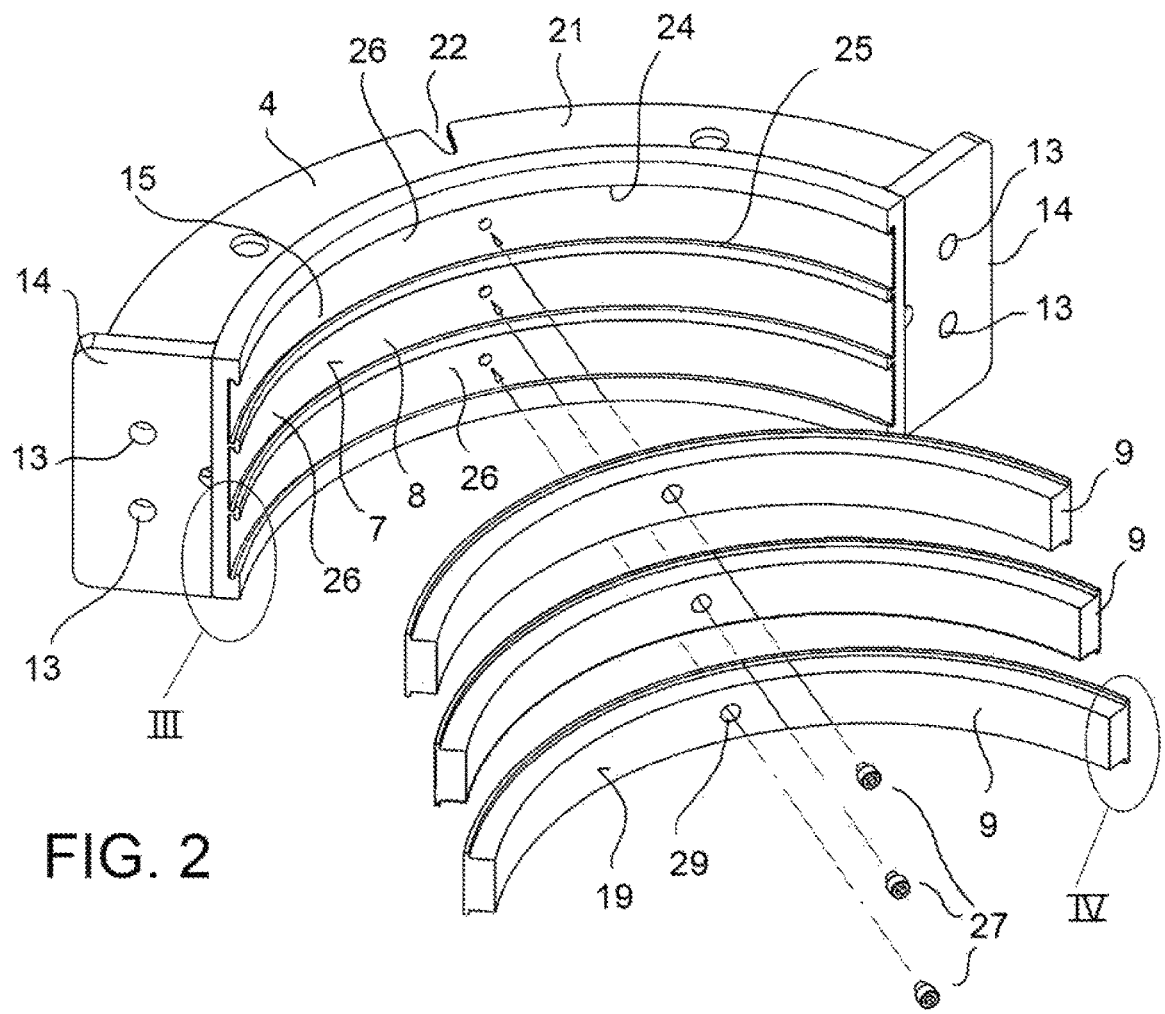
FIG. 2 is a perspective view of a ring segment with damping elements and constraint portions of a damping device according to an embodiment.
Figure 3:
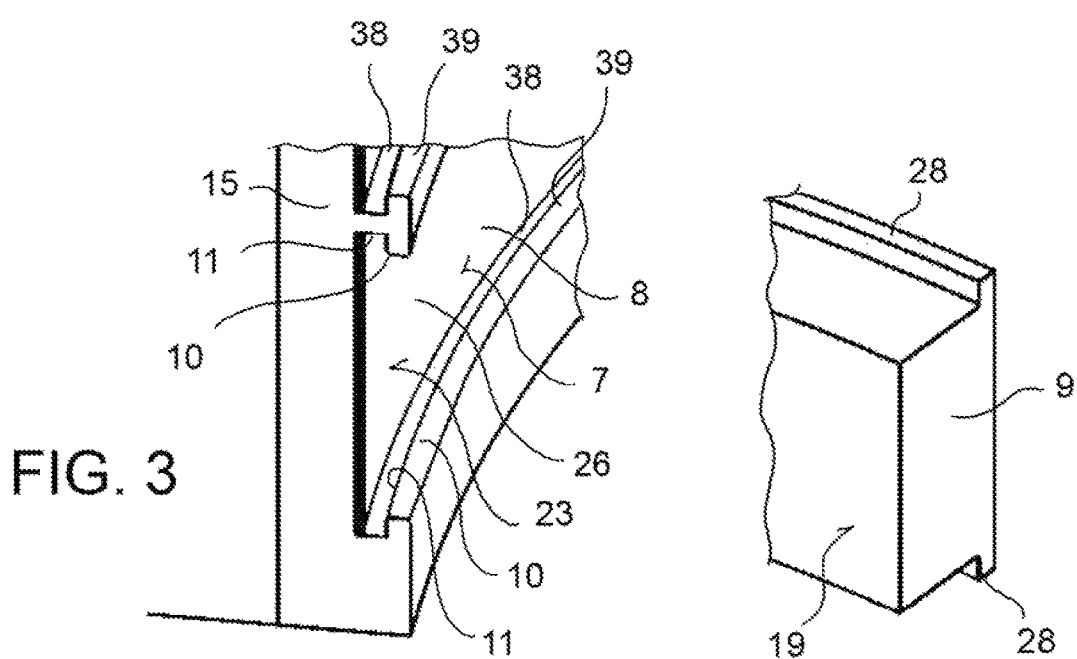
FIGS. 3 and 4 are enlarged views of details III and IV in FIG. 2.

In one or more intermediate positions, preferably midway between the circumferential ends of the ring segment 4, the base surfaces 23 form a threaded hole or a seat for removably accommodating a screw or a pin 27 which forms the aforesaid circumferential constraint portion (FIGS. 2, 3).

The damping elements 9 have an elongated shape with substantially constant and rectangular or trapezoidal cross section and with two side ribs 28 projecting from the rectangular or trapezoidal cross-section on two opposite sides at a radially outer surface of the damping element 9. The side ribs 28 extend in segments or continuously along the entire length of the damping element 9.

Figure 4:
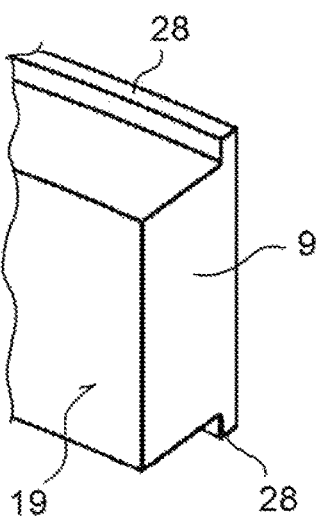

The radial section shape of the damping elements 9, in particular at the side ribs 28, substantially matches the "T" shape of the channels 26, so as to allow an insertion of the damping element 9 in the channel 26 with a sure predetermined positioning (by means of the side ribs 28 of the damping element 9 in the grooves 38 of the channel 26) and the shape coupling with radial and axial constraint (FIGS. 3, 4). The circumferential centering and fixing of the damping element 9 in the insertion channel 26 occurs by inserting the pin 27 in a corresponding hole 29 of the damping element 9 (FIG. 2).

FIGS. 11-16 show embodiments of the damping elements 9. According to embodiments, the radially inner edges, opposite to the side ribs 28, may be right angles or rounded (FIGS. 12, 13), and some of the damping elements 9 may form cavities which are empty inside to increase the deformability, the outer shape being equal.

According to embodiments for pipes with diameter either greater than or equal to six inches (168 mm) (FIG. 11):
- the axial width B of the profile of the damping element 9 (without considering the side ribs 28) is in the 40 mm . . . 50 mm . . . 60 mm range,
- the axial width B28 of each side rib 28 is in the 3 mm . . . 4.5 mm . . . 7 mm range,
- the radial height H of the entire profile of the damping element 9 is in the 20 mm . . . 25.5 mm . . . 30 mm range,
- the radial height H28 of the side ribs alone 28 is in the 2 mm . . . 3 mm . . . 5 mm range. The underlined values are those of a preferred embodiment.

According to an embodiment for pipes of diameter smaller than six inches (168 mm), the size of the profile of the damping element 9 is advantageously chosen according to the diameter of the pipe, e.g. according to the following dimensioning criteria:
- the axial width B of the profile of the damping element 9 (without considering the side ribs 28) is in the 40 mm×Ø/6 . . . 50 mm×Ø/6 . . . 60 mm×Ø/6 range,
- the axial width B28 of each side rib 28 is in the 3 mm× Ø/6 . . . 4.5 mm×Ø/6 . . . 7 mm×Ø/6 . . . range,
- the radial height H of the entire profile of the damping element 9 is in the 20 mm×Ø/6 . . . 25.5 mm×Ø/6 . . . 30 mm×Ø/6 range,
- the radial height H28 of the side ribs 28 alone is in the 2 mm×Ø/6 . . . 3 mm×Ø/6 . . . 5 mm×Ø/6 range. The underlined values are those of a preferred embodiment. The symbol "Ø" represents the diameter of the pipe expressed in inches.

The damping element 9 forms a series of grooves 35 extending in the circumferential direction and possibly parallel to one another, e.g. with an axial distance D35 in the 1.5 mm . . . 2 mm . . . 4 mm range on two radially opposite surfaces thereof and in pressing contact radially against the pipe 2 and the damper seat 8, respectively. The grooves 35 (being temporarily able to accommodate a volatile lubricant fluid) ease the insertion of the damping elements 9 in the channels 26, facilitate the release of air or impurities from the compression interfaces and improve the adhesion and the friction in the compression interfaces.

Figure 1:
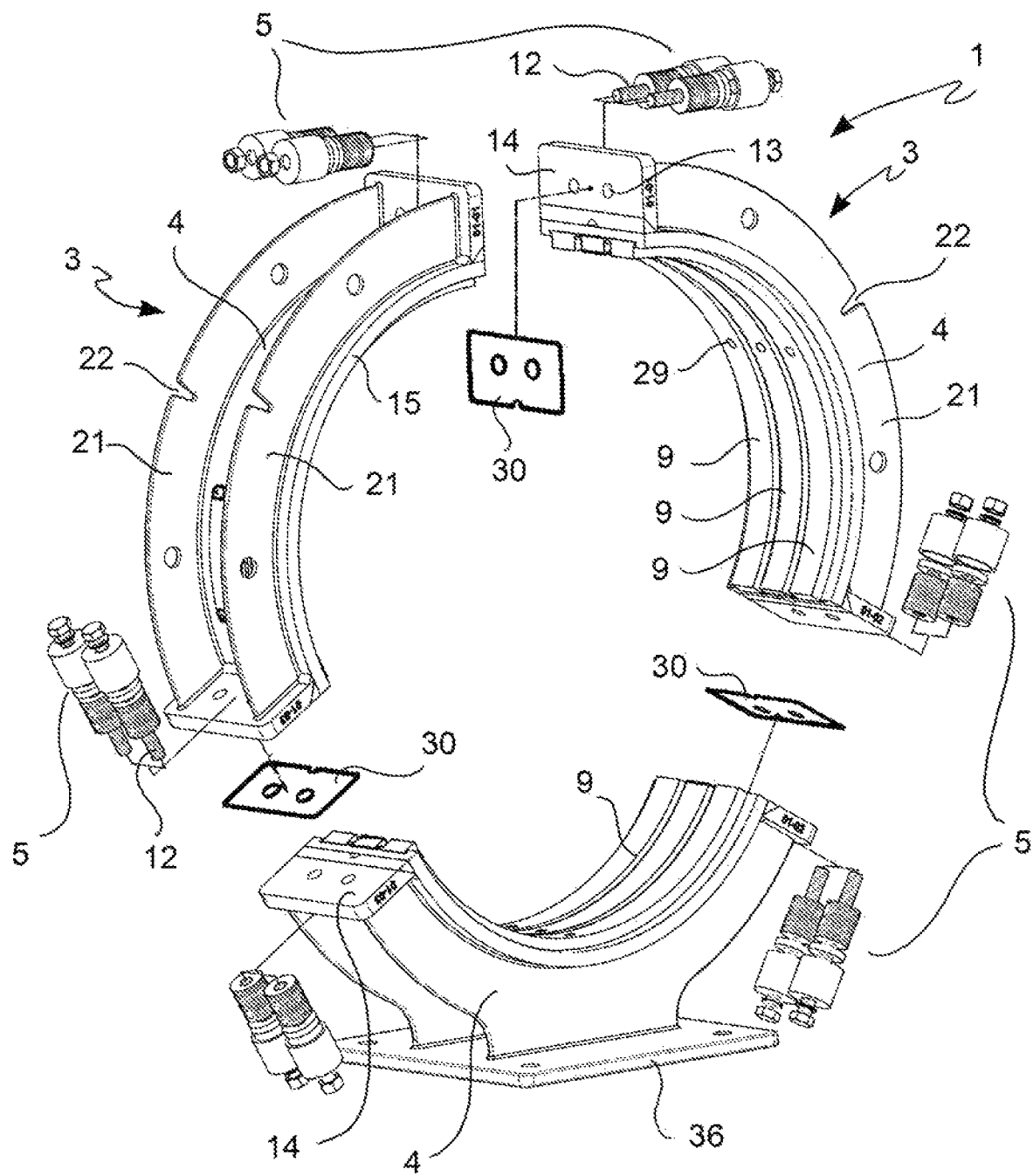
FIG. 1 is an exploded view of a damping device for pipelines, which can be used in combination with an outer constraint of the piping, according to an embodiment.
Figure 8:
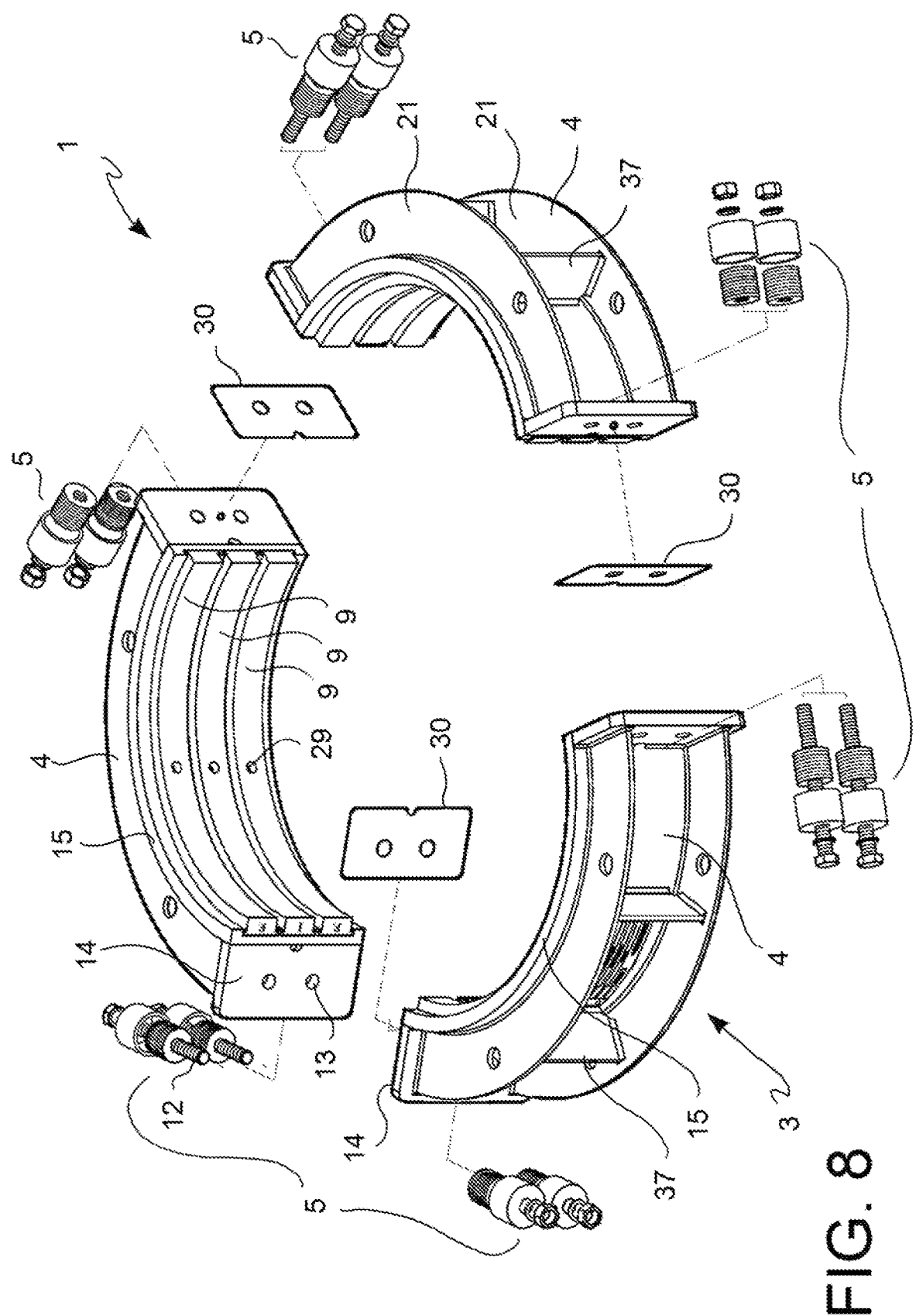
FIG. 8 is an exploded view of a damping device for pipelines, which can be used in absence of an outer constraint of the pipeline, according to an embodiment.
Figure 9:
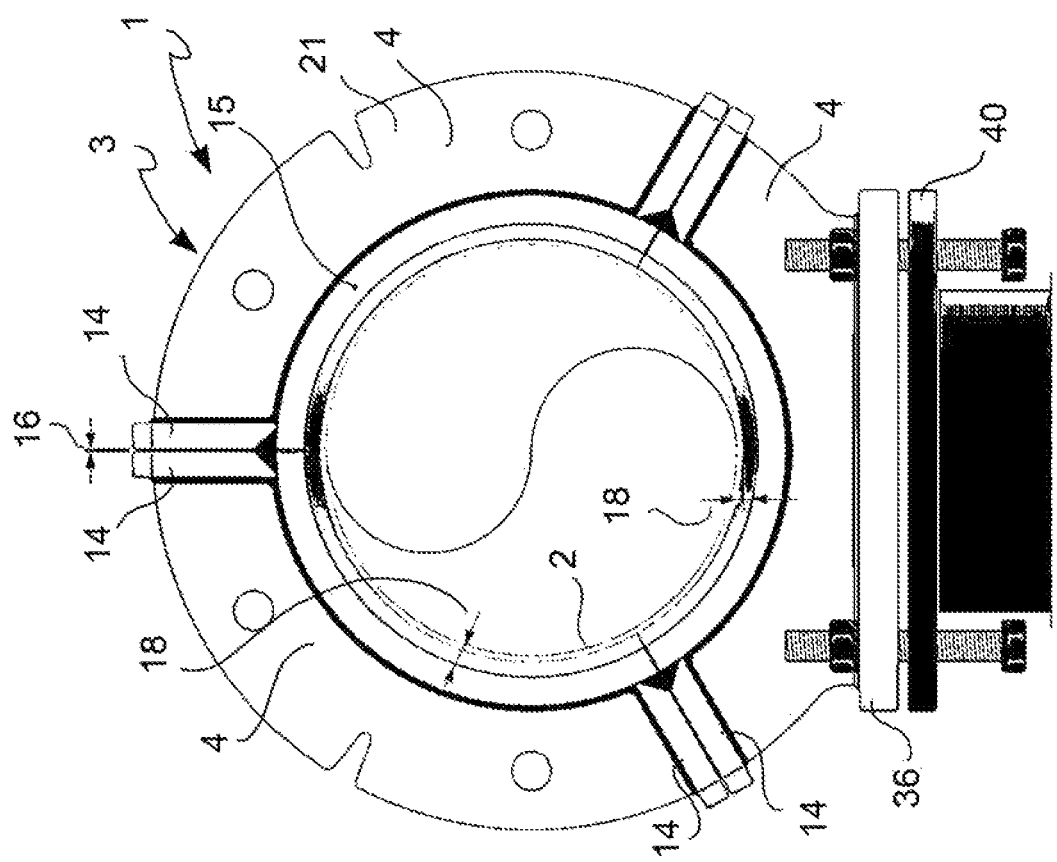
FIGS. 9 and 10 are views in axial direction of the damping device applied to the pipe in non-precompressed configuration (FIG. 9) and in radial precompression configuration of the damping elements (FIG. 10) by means of circumferential tightening of the compression ring.
Figure 10:
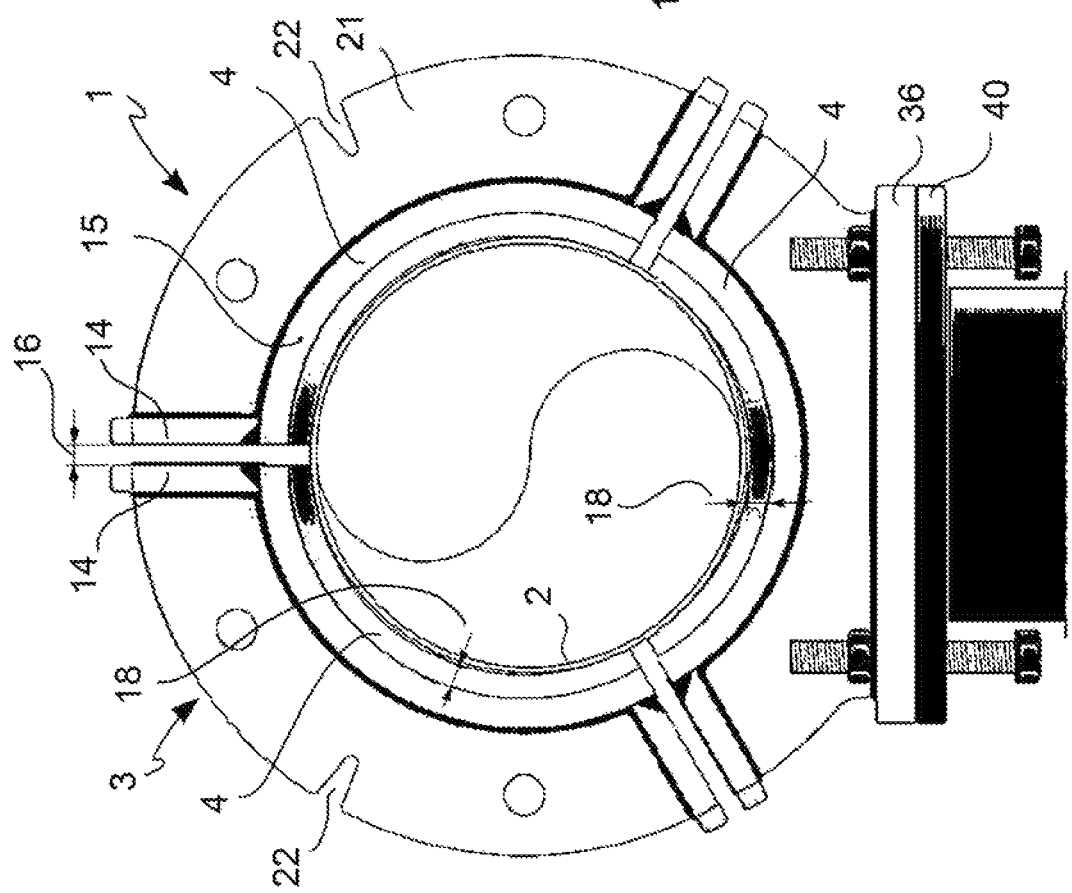

A sealing layer 30 made of elastomeric material may be provided between adjacent connection plates 14, preferably glued onto one of the two connection plates 14 (FIGS. 1, 8).

Figure 5:
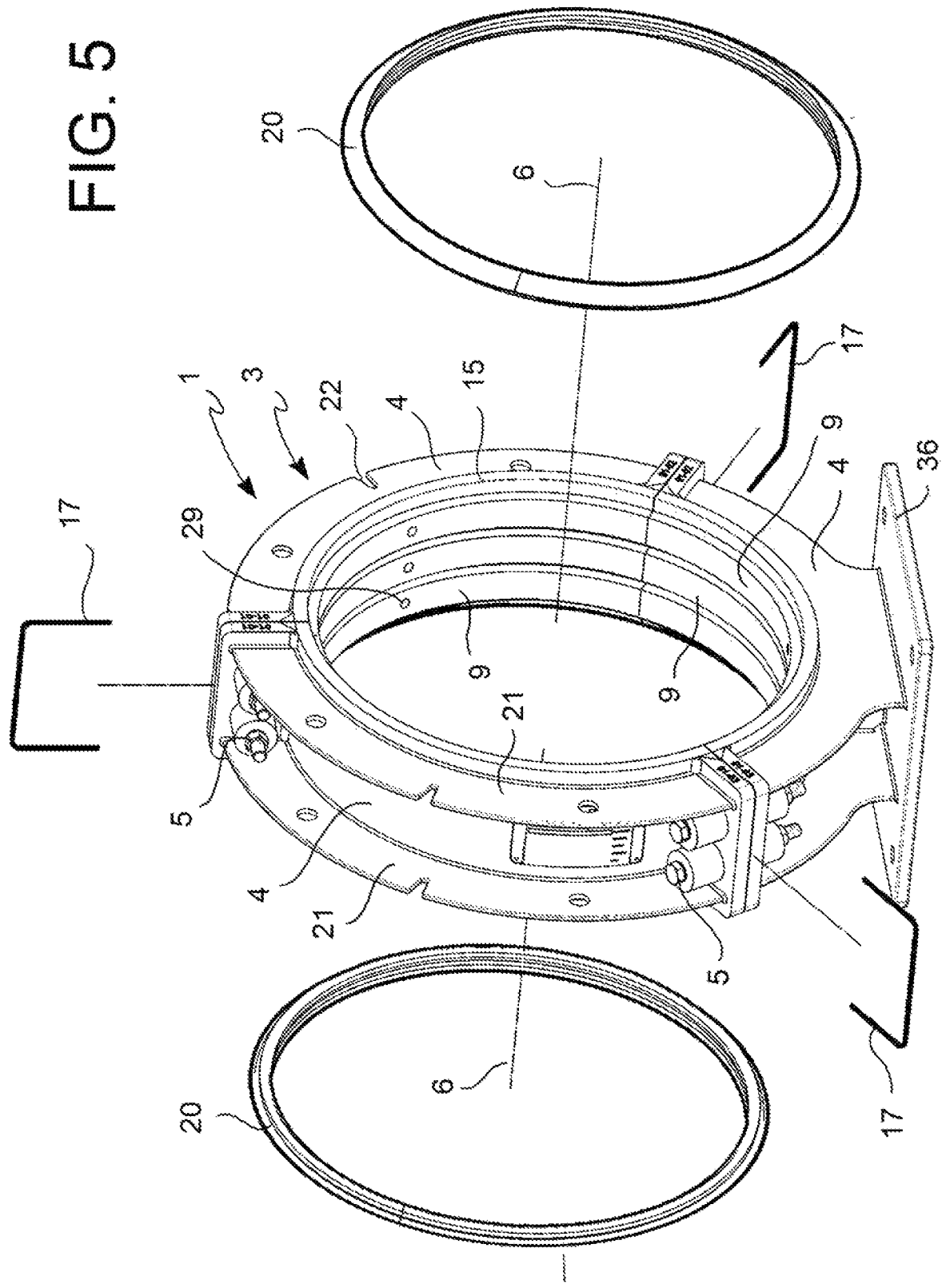
FIG. 5 is a perspective view of the damping device in FIG. 1 in mounted configuration, before the application of sealing gaskets (pipe not shown)
Figure 6:
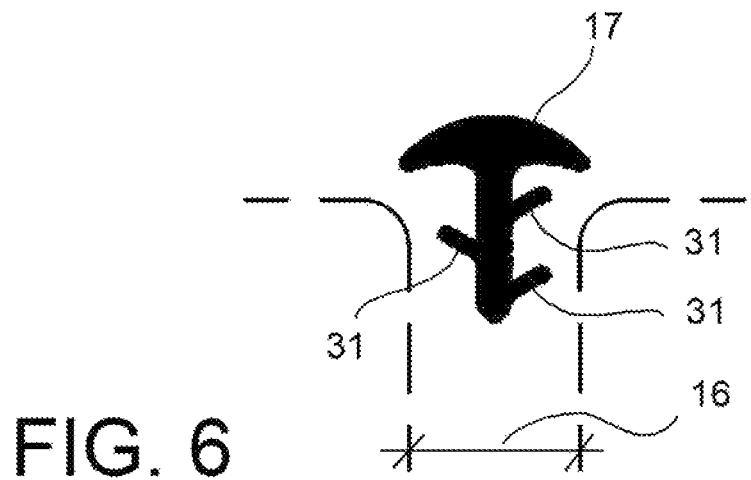
FIGS. 6 and 7 are section views of the sealing gaskets of the damping device according to embodiments.
Figure 7:
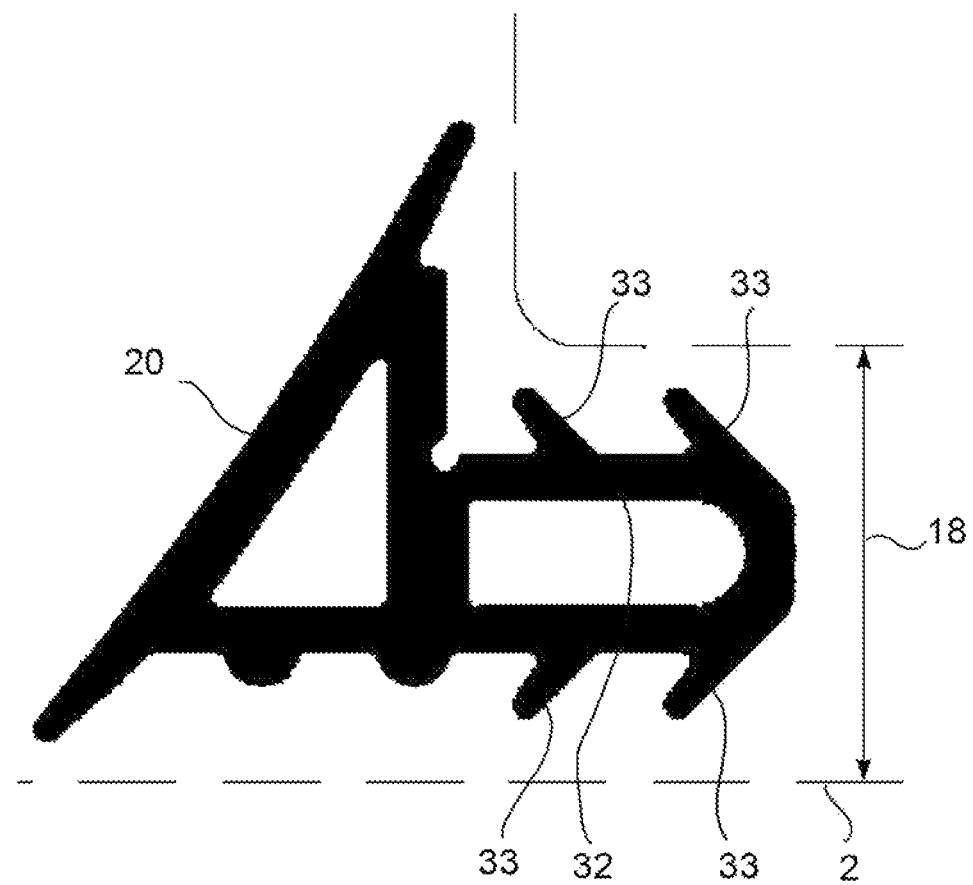

FIGS. 5, 6, 7 show an embodiment and assembly of the radial 17 and circumferential 20 seals. The radial seal 17 may have a general "U" shape and a "T" section with a plurality of barbed portions 31. The circumferential seal 20 may have a global filiform or circular cut ring shape with a radially compressible insertion portion 32, preferably internally empty, provided with a plurality of outward protruding barbed portions 33.

The damping device 1 may further comprise a connection pedestal 36 formed integrally, e.g. by welding, with one of the ring segments 4 (FIG. 1). The connection pedestal 36 forms a plate with holes for connection by bolts or screws to a support structure 40. Such a connection may occur by interposition of a layer of elastomeric damping material.

For large diameter pipes 2, and in presence of high radial precompression forces in the damping elements 9, the ring segments 4 may comprise one or more transversal reinforcement walls 37 oriented on planes radial to the axis 6 and welded both to the reinforcement walls 21 and to the base wall 15 (FIG. 8).

FIGS. 16 and 17 diagrammatically illustrate the deformation response of a damping element 9 in the case of displacement, e.g. axial thermal expansion of the pipe 2 with respect to a fixing made by means of the damping device 1.

FIGS. 18 and 19 illustrate the application of the damping device 1 to a free stretch of pipe with combined effect of damping local cross-section deformations and of auxiliary inertial mass damper. In this case, the auxiliary mass is provided prevalently by the mass of the steel compression ring 3, the weight of which may be varied, e.g. by choosing a given number of damping devices 1 applied to the pipe 2 next to one another, or by dimensioning a single damping device 1.

FIG. 20 shows the section deformations caused by flexural vibrations.

FIGS. 21 and 22 show transversal displacements or flexural vibrations of a pipe 2 which are attenuated and dissipated by means of the damping device 1.

FIGS. 23, 24 illustrate embodiments in which the stiffness or radial deformability of the damping elements 9 is influenced by the choice of the radial height of the ribs 39 of the channels 26, which are configured (dimensioned and positioned) so as to either prevent or limit an expansion of the damping elements 9 transversal to the radial direction. The prevention of the transversal expansion on more or less high radial height stiffens the damping elements 9 more or less strongly, by establishing a compression state on two axes and, as a result of the long length of the damping elements 9, a nearly three-dimensional compression state (of the hydrostatic type), with low compressibility or partial incompressibility.

FIGS. 25, 26, 27 illustrate factors which influence the mechanical response and stiffness/deformability of the damping elements 9, in particular the choice of the radial height of the side ribs 39 (see the difference between FIG. 25 and FIG. 26) and the choice of the precompression and radial predeformation of the damping elements 9 (see the difference between FIG. 27 and FIG. 25).

FIGS. 28 A-F show damping systems of pipes made by means of one or more damping devices 1 according to the invention applied to the pipe 2 or to a system of pipes 2 and connected to each other by means of the pipe 2 itself and/or by means of additional mechanical connections placed in parallel to the pipe, in which the additional mechanical connections may comprise dampers or combinations of dampers and springs, e.g. elastic or gas springs.

According to a first embodiment (FIG. 28A), the damping system comprises a first damping device 1 applied to a first section of the pipe 2 and connected to a supporting structure 40, e.g. a fixing to the ground, so as to constrain the first section of the pipe 2 to the supporting structure 40, as well as one or more second damping devices 1 applied to respective second pipe portions 2 and not connected to other supporting structures.

In this embodiment, the first damping device 1 fixes the pipe 2 and damps and dissipates the kinetic energy of (global) displacements and of (local) deformations of the first section of the pipe 2 by means of deformations with hysteresis of the damping elements 9, while the second damping device 1 does not fix the pipe 2, but dissipates the kinetic energy of (global) displacements and of (local) deformations of the second section of the pipe 2, by means of local deformations with hysteresis of the damping elements 9 and by means of damping with auxiliary inertia mass given by the not externally constrained mass of the compression ring 3.

According to a second embodiment (FIGS. 28B, 28C), the damping system comprises a first damping device 1 applied to a first section of the pipe 2 and connected to a supporting structure 40, e.g. a fixing to the ground, so as to constrain the first section of the pipe 2 to the supporting structure 40, as well as one or more second damping devices 1 applied to respective second pipe portions 2 connected to the first damping element 1 and/or between them by means of substantially rigid connection bars 41, possibly axially preloaded (precompressed or pretensioned) and placed parallel to the pipe 2.

In this embodiment, the first damping device 1 fixes the pipe 2 and damps and dissipates the kinetic energy of (global) displacements and of (local) deformations of the first section of the pipe 2 by means of deformations with hysteresis of the damping elements 9, while the second damping device 1 does not fix the pipe 2 in transversal direction, but damps (global) displacements and (local) deformations of the second section of the pipe 2, as well as differential displacements between the first and second section of the pipe by means of local deformations with hysteresis of the damping elements 9 and by means of damping with auxiliary inertia mass given by the not externally constrained mass of the compression ring 3.

According to a third embodiment (FIG. 28D), the damping system comprises one or more damping devices 1, free from external constraints, applied to respective sections of the pipe 2 and connected to each other by means of substantially rigid connection bars 41, possibly axially preloaded (precompressed or pretensioned) and arranged in parallel to the pipe 2.

In this embodiment, the damping devices 1 do not fix the pipe 2 in transversal direction, but damp (global) displacements and (local) deformations of the respective pipe sections 2, as well as differential displacements between the respective sections of the pipe, by means of deformations with hysteresis of the damping elements 9 and by means of damping with auxiliary mass given by the not externally constrained masses of the compression rings 3.

According to a fourth embodiment (FIGS. 28E, 28F), the damping system comprises a plurality of damping devices 1 applied to respective sections of the pipe 2 and connected to each other by means of the interposition of auxiliary dampers 42 arranged in parallel to the pipe 2. At least one of the damping devices 1 could be constrained to the supporting structure 40, while the others are preferably free from external constraints.

The auxiliary dampers 42 allow a better adjustment of the damping features of the system with reference to the differential vibration between adjacent pipe sections and to the propagation of flexural vibrations.

In an embodiment, the auxiliary dampers 42 may be known axial dampers, e.g. dampers described in EP1873435, the content of which is considered incorporated in the present description.

From FIGS. 28A-F, a person skilled in the art will appreciate that the single elements and subassemblies of the illustrated damping systems may be mutually combined or used in isolation so as to identify purposeful vibration attenuation solutions from the mechanical and acoustic point of view, but which also take into account the space conditions about the pipe to be damped.

From the figures and the description provided hereto, the person skilled in the art will appreciate the advantages of the damping device 1. The device 1 acts as an axial and transversal compensator with great efficacy and versatility by virtue of the possibility of combining the damping elements 9 in a variety of properties. The device 1 may be applied to the pipe without modifying the existing system layout (e.g. the pipe layout and size), and without stopping the functioning of a pipeline, since the device 1 does not require operations of welding to the pipe.

The size of the damping elements 9 are equal and allow the mutual interchangeability. By virtue of the configuration of the ring segments 4, the damping elements 9 are easy to accommodate and to center, maintaining fixed the position by inserting the pin 27. Finally, the damping elements 9, by virtue of their elastomeric material and the compact shape form an excellent thermal insulation for a wide range of temperatures and an acoustic insulation.

Obviously, a person skilled in art may make further changes and variants to the damping device 1, all contained within the scope of protection of the invention as defined in the following claims, in order to satisfy contingent needs and specifications.

The invention claimed is:

1. A damping device for pipelines, comprising: a compression ring having a plurality of ring segments positionable around a pipe and connectable and brought together circumferentially through a connector and tightener, to form an annular structure with an adjustable circumference with respect to an axis of the pipe;
   wherein each of the ring segments forms, in a radially inner surface thereof, a damper seat receiving a damping element made of elastomeric material, projecting radially from each of the ring segments and compressible radially against an outer surface of the pipe;
   wherein the damper seat comprises:
      one or more axial constraint portions in interlocking connection with the damping element to prevent the damping element from escaping the damper seat in an axial direction;
      one or more radial constraint portions in interlocking connection with the damping element to prevent the damping element from escaping the damper seat in a radial direction;
   wherein the damper seat forms a plurality of channels arranged side-by-side and extending along an entire circumferential extension of each of the ring segments, wherein the channels are of a same shape and are delimited by a base surface and two side surfaces, each of said side surfaces forming an undercut groove adjacent to the base surface and a side shoulder on a side of the undercut groove opposite the base surface;
   wherein the damping elements have an elongated shape with constant and rectangular or trapezoidal cross section and with two side ribs projecting from the rectangular or trapezoidal section on two opposite sides of the damping elements; and
   wherein a radial cross-section shape of the damping elements, at said side ribs, matches a shape of said undercut grooves of the channels of the damper seat, to allow insertion of the damping element in the channel with predefined positioning.

2. The damping device according to claim 1, wherein the ring segments each form a reinforcing wall oriented in a transversal plane to the axis and extending in a circumferential direction along an entire length of each of the ring segments.

3. The damping device according to claim 2, wherein in a radially outer edge of the reinforcing walls a radial notch is formed with a radial depth from ¼ to ½ of a radial height of the reinforcing wall.

4. The damping device according to claim 1, wherein the connector and tightener comprise bolts received in connection holes of connection plates at two opposite circumferential ends of each of the ring segments, so as to be able to adjust a circumferential distance between said adjacent circumferential ends.

5. The damping device according to claim 1, wherein the connector and tightener are pretensioned and configured to maintain a pre-set tension force even in the presence of small variations in distance between the ring segments.

6. The damping device according to claim 1, wherein the damper seat of each of the ring segments is configured to receive and constrain in the axial direction and in the radial direction, a plurality of the damping elements spaced apart from each other to allow each of the damping elements of a same one of the ring segments an associated radial deformation and transversal deformation with respect to the radial direction irrespective of a deformation state of other damping elements.

7. The damping device according to claim 1, wherein the damper seat of each of the ring segments is configured to removably and replaceably receive the damping element.

8. The damping device according to claim 1, comprising a plurality of the damping elements, and wherein all of the plurality of damping elements of the damping device have a same shape and size.

9. The damping device according to claim 8, wherein the plurality of said damping elements comprise a different material or a different internal structure, and are distinguished by different markings, including a different color of an elastomeric compound, unique for each type of material or internal structure.

10. The damping device according to claim 1, wherein the damper seat forms one or more circumferential constraint portions in interlocking connection with the damping element to prevent a movement of the damping element in the circumferential direction with respect to the axis.

11. The damping device according to claim 1, wherein a radial height (H) of the damping element is in the range from 20 mm to 30 mm.

12. The damping device according to claim 1, wherein the damping element has a circumferential length (L) equal to a circumferential length of each of the ring segments to which the damping element is mounted.

13. The damping device according to claim 1, wherein in an operating condition of the compression ring mounted and tightened around the pipe:
   adjacent circumferential ends of the ring segments and the corresponding adjacent circumferential ends of the damping elements are spaced apart by a distance that forms a residual precompression stroke;
   a radially inner surface of the ring segments and a radially inner surface of the damping elements are radially spaced apart by a radial distance that constitutes a residual radial compression stroke of the damping elements;
   a radial pre-deformation of the damping elements is selected in the group of ranges:
      from 2 mm to 10 mm,
      from 3 mm to 6 mm,
      5 mm.

14. The damping device according to claim 1, wherein the damping elements are arranged completely inside an axial dimension of the ring segments that project on both sides axially beyond the damping elements.

15. The damping device according to claim 1, wherein each of the ring segments comprises:
   a base wall made of metal having an arc-of-circle shape and that forms, on a concave inner side thereof, the radially inner surface with the damper seat;
   connection plates made of metal, oriented in radial planes with respect to the axis and welded to the base wall at two circumferential ends of each of the ring segments;
   two reinforcing walls made of metal, parallel to each other and perpendicular to the axis and arranged on a convex outer side of the base wall, the reinforcing walls extending in a circumferential direction, respectively close to two opposite circumferential edges of each of the ring segments, and welded both to the base wall and to each of the connection plates.

16. The damping device according to claim 1, wherein the base surfaces of the channels form a seat for removably receiving a pin inserted in a corresponding hole of the damping element and forms a circumferential constraint portion.

17. The damping device according to claim 1, wherein the damping element forms, on two radially opposite surfaces thereof and in pressing contact radially against the pipe and the damper seat, respectively, a series of grooves extending in a circumferential direction.

18. The damping device according to claim 1, comprising a connection pedestal formed integrally with one of the ring segments and having a plate with holes for connection by bolts or screws to a support structure.

* * * * *